United States Patent [19]
Chen

[11] Patent Number: 6,072,706
[45] Date of Patent: Jun. 6, 2000

[54] SWITCHING TYPE AC ADAPTER

[75] Inventor: Geoff Chen, Pan Chiao, Taiwan

[73] Assignee: Proton Electronic Industrial Co., Ltd., Taiwan

[21] Appl. No.: 09/232,658

[22] Filed: Jan. 19, 1999

[51] Int. Cl.$^7$ .............................................. H02M 7/527
[52] U.S. Cl. ................................................ 363/41; 363/97
[58] Field of Search ................................. 363/21, 26, 41, 363/95, 97

[56] References Cited

U.S. PATENT DOCUMENTS

| | | | |
|---|---|---|---|
| 4,931,609 | 6/1990 | Aoki ............................................ | 363/97 |
| 5,402,330 | 3/1995 | Megeid ...................................... | 363/21 |
| 5,734,564 | 3/1998 | Brkovic ..................................... | 363/21 |
| 5,768,118 | 6/1998 | Faulk et al. ................................ | 363/41 |
| 5,986,895 | 11/1999 | Stewart et al. ............................ | 363/97 |

*Primary Examiner*—Jeffrey Sterrett
*Attorney, Agent, or Firm*—Bacon & Thomas, PLLC

[57] ABSTRACT

A switching type AC adapter includes a current mode PWM (pulse-width-modulated) controller, a monostable multivibrator, and a MOSFET so arranged that the current mode PWM controller and the monostable multivibrator are operated to let switching of the MOSFET be synchronized to synchronous signal from a synchronous circuit when the switching type AC adapter is electrically connected, enabling horizontal synchronizing interference to be concealed behind retrace time, and kept away from the screen of video equipment in which the switching type AC adapter is installed.

1 Claim, 2 Drawing Sheets

SWITCHING TYPE AC ADAPTER

BACKGROUND OF THE INVENTION

The present invention relates to a switching type AC adapter, and more particularly to such a switching type AC adapter in which a current mode PWM (pulse-width-modulated) controller, a monostable multivibrator, and a MOSFET are installed, and operated to eliminate presence of horizontal synchronizing interference on the screen.

A regular switching type AC adapter for an electric apparatus is comprised of a switching element, which is alternatively switched on and off to let a stable voltage be provided to the electric apparatus for working. When this structure of switching type AC adapter is used in a monitor, voltage waveform and current waveform are changed quickly upon switching of the switching element, causing the displayed picture to be interfered with an interference. More particularly, when this structure of switching type AC adapter is used in a television set, image signal which was converted from radio signal by a tuner tends to be interfered with harmonic waves, causing the picture to be distorted.

SUMMARY OF THE INVENTION

The present invention has been accomplished to provide a witching type AC adapter which eliminates the aforesaid problem. According to the present invention, a current mode PWM (pulse-width-modulated) controller, a monostable multivibrator, and a MOSFET are installed in the switching type AC adapter, and so arranged that the current mode PWM controller and the monostable multivibrator are operated to let switching of the MOSFET be synchronized to synchronous signal from a synchronous circuit when the switching type AC adapter is electrically connected, enabling horizontal synchronizing interference to be concealed behind retrace time, and kept away from the screen of the video equipment in which the switching type AC adapter is installed.

DETAILED DESCRIPTION OF THE PREFERRED EMBODIMENT

Figure 1:
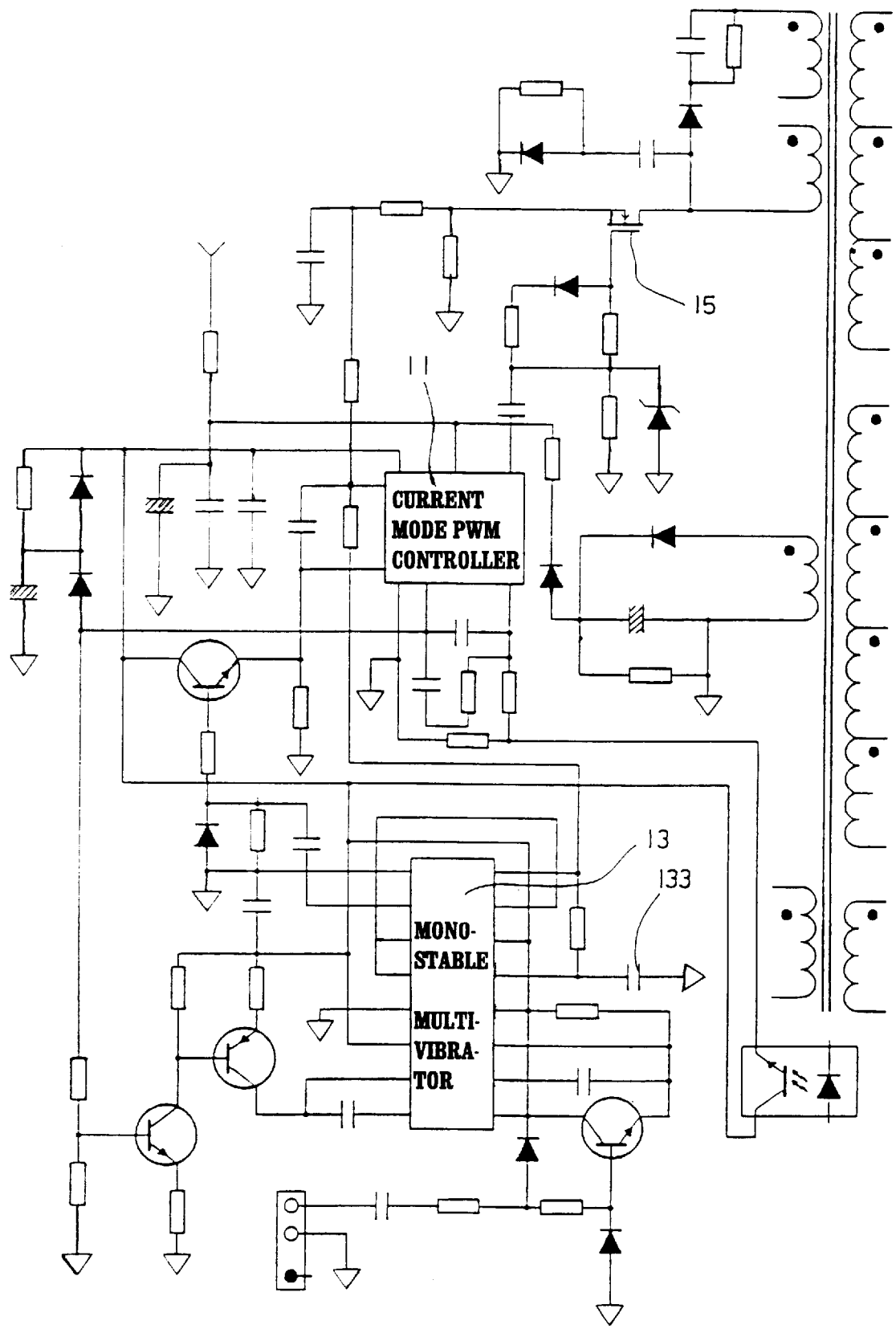
FIG. 1 is a detailed circuit diagram of the present invention.

Referring to FIG. 1, a switching type AC adapter in accordance with the present invention is generally comprised of a current mode PWM (pulse-width-modulated) controller 11, a monostable multivibrator 13, and a MOSFET (metal-oxide semiconductor field effect transistor) 15.

Figure 2:
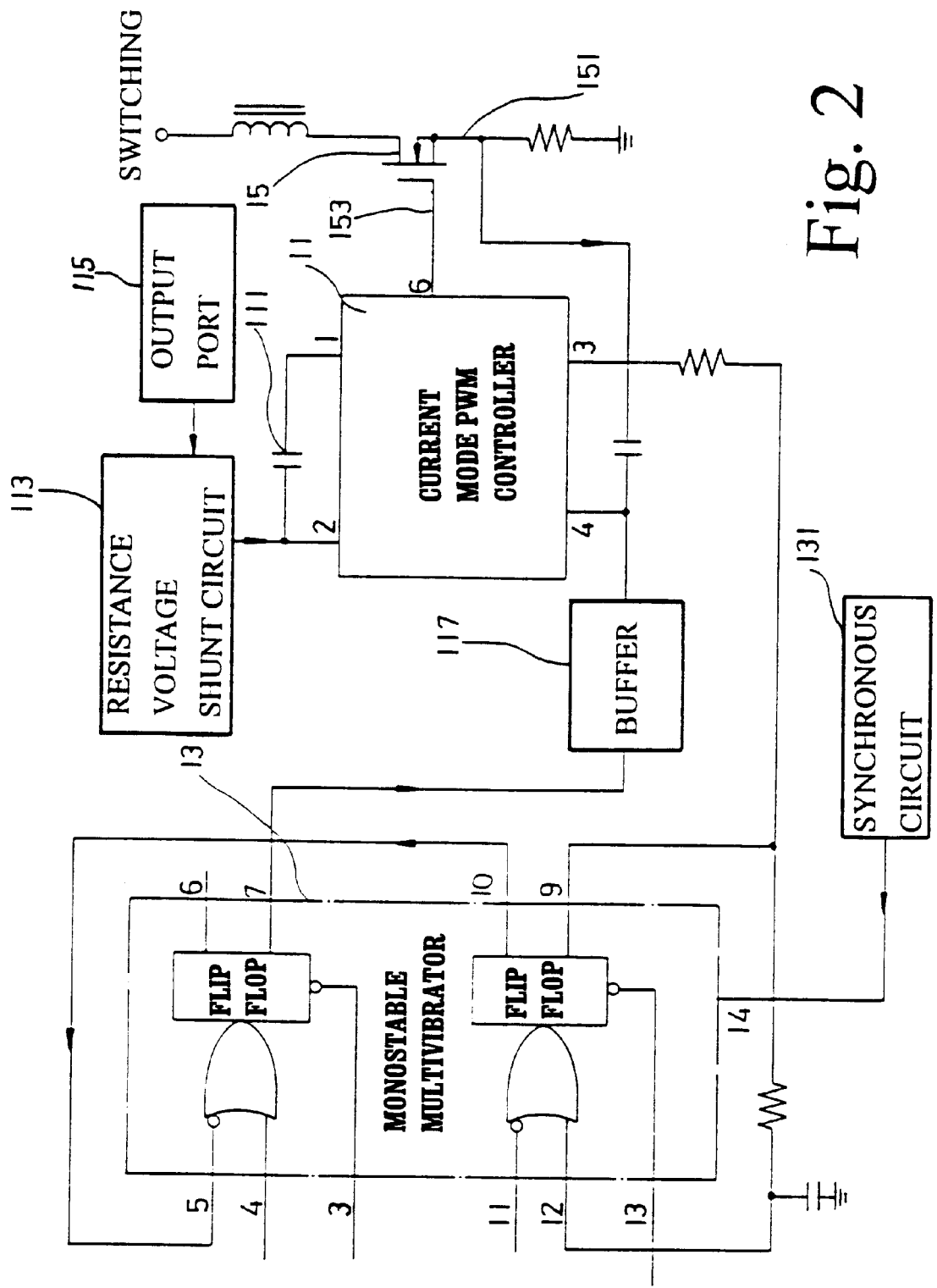
FIG. 2 is a circuit block diagram of a part of the present invention.

Referring to FIG. 2, the current mode PWM controller 11 can be a "3842" IC, and the monostable multivibrator 13 can be a "4528" IC. The 1st pin and 2nd pin of the current mode PWM controller 11 are connected in parallel to a capacitor 111. The 2nd pin of the current mode PWM controller 11 is connected to the output port 115 of the switching type AC adapter through a resistance voltage shunt circuit 113, to monitor output voltage at the output port 115. The third pin of the current mode PWM controller 11 is connected to the source 151 of the MOSFET 15. The 4th pin of the current mode PWM controller 11 is connected to the 7th pin of the monostable multivibrator 13 through a buffer 117. The 6th pin of the current mode PWM controller 11 is connected to the gate 153 of the MOSFET 15.

The monostable multivibrator 13 is used as a free running O.S.C. during asynchronous stage, and also used as an off time control when the switching type AC adapter is switched on. the 5th pin and 10th pin of the monostable multivibrator 13 are connected to each other. The 9th pin and 12th pin of the monostable multivibrator 13 are respectively connected to the 3rd pin of the current mode PWM controller 11. The 3rd, 4th and 5th pins of the monostable multivibrator 13 drive the 6th pin and 7th pin of the monostable multivibrator 13 to provide a positive pulse and a negative pulse respectively upon changing of logic level (0, 1). The 13th, 12th and 11th pins of the monostable multivibrator 13 drive the 10th pin and 9th pin of the monostable multivibrator 13 to provide a positive pulse and a negative pulse respectively upon changing of logic level (0,1). The 14th pin of the monostable multivibrator 13 is connected to a synchronous circuit 131.

Referring to FIGS. 1 and 2 again, when boosted, the 12th pin of the monostable multivibrator 13 is charged by the capacitor 133, causing the 10th pin of the monostable multivibrator 13 to provide a positive pulse, and the 7th pin of the monostable multivibrator 13 to provide a negative pulse in driving the current mode PWM controller 11, and at the same time the synchronous circuit 131 is controlled by pulse output control time inputted from the 14th pin of the monostable multivibrator 13 to let the current mode PWM controller 11 be controlled by pulse time from the monostable multivibrator 13. Therefore, switching time of the MOSFET 15 is synchronized to the synchronous signal from the synchronous circuit 131.

Because the switching of the switching type AC adapter is controlled by a synchronous signal and concealed behind retrace time, interference produced upon switching operation of the AC adapter is kept from sight, i.e., no horizontal synchronizing interference is appeared on the screen. When the AC adapter is used in a television set, harmonic wave interference is concealed behind visible picture, and therefore no interference is seen on the screen.

It is to be understood that the drawings are designed for purposes of illustration only, and are not intended as a definition of the limits and scope of the invention disclosed.

What the invention claimed is:

1. A switching type AC adapter comprising:

an output port for voltage output;

a current mode PWM controller connected to said output port through a resistance voltage shunt circuit to monitor variation of voltage output at said output port;

a synchronous circuit;

a monostable multivibrator connected to said current mode PWM controller and said synchronous circuit, and controlled to output a positive pulse and a negative pulse upon changing of logic level; and a MOSFET having a gate connected to said current mode PWM controller, and a source connected to said monostable multivibrator through a buffer;

wherein said monostable multivibrator is charged to output a positive pulse and a negative pulse to drive said current mode PWM controller when the switching type AC adapter is electrically connected, and at the same time said synchronous circuit is controlled by a pulse output control time inputted from said monostable multivibrator to let said current mode PWM controller be controlled by pulse time from said monostable multivibrator, enabling switching time of said MOSFET be synchronized to synchronous signal from said synchronous circuit.

* * * * *